United States Patent [19]

Suizu et al.

[11] Patent Number: 5,696,819
[45] Date of Patent: Dec. 9, 1997

[54] SPEECH COMMUNICATION APPARATUS

[75] Inventors: Shinichi Suizu; Yuji Umemoto, both of Tokyo, Japan

[73] Assignee: Kabushiki Kaisha Toshiba, Kawasaki, Japan

[21] Appl. No.: 187,523

[22] Filed: Jan. 28, 1994

[30] Foreign Application Priority Data

Jan. 29, 1993 [JP] Japan ................... 5-013522

[51] Int. Cl.$^6$ .................................. H04M 9/08
[52] U.S. Cl. ............. 379/390; 379/388; 379/406; 379/410; 379/409; 370/286; 370/289
[58] Field of Search .................. 379/410, 406, 379/388, 389, 390, 391, 409, 411; 370/32.1, 286, 288, 289, 290, 291

[56] References Cited

U.S. PATENT DOCUMENTS

| | | | |
|---|---|---|---|
| 4,064,379 | 12/1977 | Homa | 379/411 |
| 4,144,417 | 3/1979 | Oshima et al. | 379/410 |
| 4,232,400 | 11/1980 | Yamamoto et al. | 455/305 |
| 4,577,071 | 3/1986 | Johnston et al. | 379/410 |
| 4,578,543 | 3/1986 | Le Bourlot et al. | 379/410 |
| 4,827,472 | 5/1989 | Ferrieu | 370/32.1 |
| 4,912,758 | 3/1990 | Arbel | 379/411 X |
| 4,979,163 | 12/1990 | Erving et al. | 370/32.1 |
| 4,984,265 | 1/1991 | Connan et al. | 379/390 |
| 5,016,271 | 5/1991 | Ford | 379/410 |
| 5,136,577 | 8/1992 | Amaro et al. | 370/32.1 |
| 5,185,789 | 2/1993 | Hanon et al. | 379/395 |
| 5,239,586 | 8/1993 | Marui | 381/47 |
| 5,263,079 | 11/1993 | Umemoto | 379/58 |
| 5,297,198 | 3/1994 | Butani et al. | 379/389 |
| 5,305,307 | 4/1994 | Chu | 370/32.1 |
| 5,313,498 | 5/1994 | Saro | 375/103 |
| 5,353,348 | 10/1994 | Sendyk et al. | 379/410 |
| 5,390,244 | 2/1995 | Hinman et al. | 379/386 |
| 5,390,250 | 2/1995 | Janse et al. | 379/410 |
| 5,418,848 | 5/1995 | Armbruster | 379/406 |
| 5,475,731 | 12/1995 | Rasmusson | 379/410 X |
| 5,598,468 | 1/1997 | Ammicht et al. | 379/406 X |

*Primary Examiner*—Krista M. Zele
*Assistant Examiner*—Devendra T. Kumar
*Attorney, Agent, or Firm*—Banner & Witcoff, Ltd.

[57] ABSTRACT

A dual mode mobile telephone apparatus includes an echo canceler. In a hands-free conversation mode, a received speech output from a loudspeaker is input to a microphone by circulate cross talk and transmitted to the destination side so that an acoustic echo may be generated. The echo canceler cancels the acoustic echo. A center clipper for eliminating a residual echo signal having a level lower than a preset level is provided at the output side of the echo canceler. Enabling/disabling operations of the center clipper are controlled in accordance with a volume control level for a reception signal and transmission/reception state detection signal from a voice switching circuit which controls gains of reception channel and transmission channel in the opposite directions.

39 Claims, 9 Drawing Sheets

|  | ECHO CANCELER 30 | SPEECH SWITCHING CIRCUIT 50 | CENTER CLIPPER 36 |
|---|---|---|---|
| SPEECHLESS | OFF | • RECEPTION ATT 51 ON<br>• TRANSMISSION ATT 52 OFF | OFF |
| RECEPTION / HIGH VOLUME CONTROL LEVEL | ON | • RECEPTION ATT 51 OFF<br>• TRANSMISSION ATT 52 ON | ON |
| RECEPTION / LOW VOLUME CONTROL LEVEL | ON | • RECEPTION ATT 51 OFF<br>• TRANSMISSION ATT 52 ON | OFF |
| TRANSMISSION | OFF | • RECEPTION ATT 51 ON<br>• TRANSMISSION ATT 52 OFF | OFF |
| DOUBLETALK | OFF | • RECEPTION ATT 51 ON<br>• TRANSMISSION ATT 52 OFF | OFF |

SPEECH COMMUNICATION APPARATUS

BACKGROUND OF THE INVENTION

1. Field of the Invention

The present invention relates to a speech communication apparatus such as a digital mobile telephone apparatus having an echo canceler for canceling an acoustic echo generated at the time of hands-free telephone conversation and a center clipper for eliminating a residual echo signal which has passed through the echo canceler and has a level not higher than a preset level.

2. Description of the Related Art

Conventionally, for example, some radio telephone apparatuses for car use such as mobile telephone apparatuses have a hands-free telephone conversation mode in addition to a handset telephone conversation mode. The hands-free telephone conversation mode is a mode which can be attained by using a loudspeaker for reception and a microphone for transmission mounted on a telephone unit, a dash board, or the like provided in addition to the handset and in which the loudspeaker and microphone are used as a handset to permit telephone conversation. When the hands-free telephone conversation mode is used, the speaker can speak over the telephone without holding the handset, and therefore, the speaker can speak over the telephone without driving the car one-handed and it is highly effective to enhance the safety in the driving.

However, if the hands-free telephone conversation mode is used, the received speech output from the loudspeaker during the conversation is input to the microphone by the circulate cross talk and transmitted to the destination side so that an acoustic echo may be generated. For this reason, an echo canceler for canceling the acoustic echo is generally provided in this type of telephone apparatus. The echo canceler is indispensable particularly in a digital radio telephone apparatus for coding a sound signal into a digital signal and transmitting the same because the amount of signal delay by the speech coding/decoding circuit (speech CODEC) and error correction coding/decoding circuit (channel CODEC) is large and the acoustic echo gets on the speaker's nerves very much.

A conventional echo canceler is formed of a digital signal processor. The digital signal processor comprises an arithmetic operation means for simulating an acoustic characteristic of an echo path from the loudspeaker to the microphone, a subtraction means for obtaining a difference between the output of the arithmetic operation means and a sound input from the microphone, and means for changing the acoustic characteristic of the echo path simulated by said arithmetic operation means in order to make the output of the subtraction means zero.

A sound signal to be supplied to the loudspeaker is supplied to the arithmetic operation means, thereby generating a pseudo echo signal. The acoustic echo signal can be canceled by subtracting the pseudo echo signal from the transmission signal (including an echo signal) supplied from the microphone. When the acoustic characteristic of the echo path changes, the output from the subtraction means becomes non-zero. Therefore, if the acoustic characteristic of the echo path (coefficients of the arithmetic operation means) changes in order to make the output of the subtraction means non-zero, it is possible to cancel the echo signal.

However, the speech communication apparatus having the above echo canceler has the following problem which must be solved. That is, in order to realize the high-quality communication free from influence of the acoustic echo, it is necessary to fully cancel not only the acoustic echo components of intermediate and high levels but also the acoustic echo component of low level in the echo canceler. However, in order to fully cancel the acoustic echo component of low level by use of the echo canceler, it is necessary to increase a following characteristic of the echo canceler and significantly enhance the precision of the adaptive process in the echo canceler. For this purpose, it becomes necessary to cause the echo canceler to effect a large number of arithmetic operations at a high speed by increasing a frequency of a clock pulse, thereby raising the cost of the apparatus and increasing the power consumption thereof.

SUMMARY OF THE INVENTION

Accordingly, it is an object of the present invention to provide a speech communication apparatus which can fully cancel the low-level acoustic echo component without causing the echo canceler to effect a large number of arithmetic operations at a high speed, which is low in cost, whose power consumption is small and which may permit the high-quality communication.

A related object of the present invention is to provide a speech communication apparatus which can be realized with a simple circuit construction without making a large-scale change in the circuit and addition of a circuit.

A further object of the present invention is to provide a speech communication apparatus which can interrupt the clip operation when the received sound volume is small even in the reception state and permit transmission of the background noise, thereby enhancing the naturalness of the telephone conversation.

According to the present invention, there is provided a speech communication apparatus comprising:

communication means for transmitting a speech signal and for receiving a speech signal;

loudspeaker means for outputting a speech signal received by the communication means;

microphone means for inputting a speech signal to the communication means;

echo cancel means, connected between the loudspeaker means and the communication means, and connected between the microphone means and the communication means, for canceling an echo signal which is generated due to a fact that a speech signal output from the loudspeaker means is input to the microphone means;

clip means, connected to the echo cancel means for receiving a transmission signal output from the echo cancel means, for clipping a transmission signal whose level is lower than a preset level;

means for comparing a level of a reception signal supplied to the loudspeaker means and a level of a transmission signal input by the microphone means to determine whether the apparatus is set in a reception state or a transmission state; and first control means for controlling an operation of the clip means based on a result of determination by the comparing means.

According to the present invention, a residual echo signal of the preset level or less output from the echo canceler means is clipped by the clip means and thus eliminated. As a result, it becomes unnecessary to effect an arithmetic operation for canceling the acoustic echo signal of the preset level or less in the echo canceler means, thereby alleviating the load of the echo canceler means. Therefore, it becomes possible to lower the operation speed of the echo canceler means can be made simple in construction and low in cost.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of a speech communication apparatus according to a first embodiment of the present invention will now be described with reference to the accompanying drawings.

Figure 1:
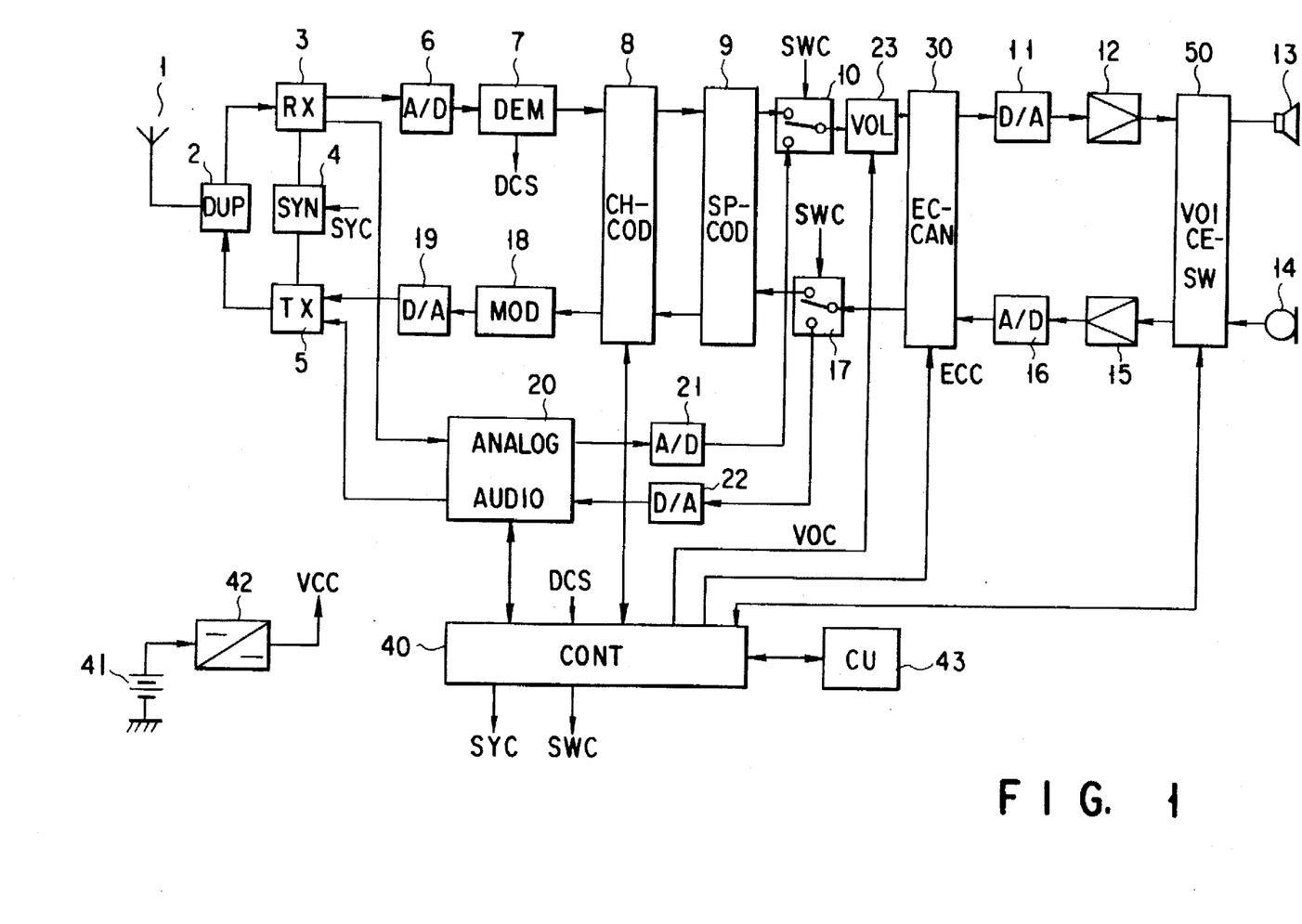
FIG. 1 is a circuit block diagram showing the construction of a dual mode radio telephone apparatus according to a first embodiment of the present invention.

FIG. 1 is a circuit block diagram showing the construction of a dual mode radio telephone apparatus according to the first embodiment of the present invention.

The dual mode is a system using both of the analog mode and digital mode. The analog mode is a system in which a carrier is subjected to an FM modulation, for example, by use of an analog speech signal and transmission data to be transmitted in a transmission apparatus and then transmitted and a modulated carrier transmitted from the transmission apparatus is received and subjected to an FM demodulation to reproduce the analog speech signal and the transmission data in the reception apparatus. The digital mode is a system in which a speech signal and transmission data are encoded in a transmission apparatus and then a carrier is digital-modulated by use of the coded signal according to a π/4 shift DQPSK (π/4 Shifted, differentially encoded quadrature phase shift keying) system, for example, and then transmitted, and the modulated wave is received and subjected to a digital demodulation and a demodulated signal is decoded to reproduce the speech signal and transmission data.

A radio frequency signal transmitted from a base station (not shown) via a digital telephone channel or an analog telephone channel is received by an antenna 1 and then input to a receiver circuit (RX) 3 via a duplexer (DUP) 2. In the present invention, the antenna 1 is used as both a transmission antenna and a reception antenna by switching the duplexer 2. In the receiver circuit 3, the radio frequency signal is mixed with a reception local oscillation signal output from a frequency synthesizer (SYN) 4 and is converted into an intermediate frequency signal. The reception local oscillation signal output from the frequency synthesizer 4 is indicated by a control signal SYC output from a control circuit 40. When the receiver circuit 3 receives the radio frequency signal transmitted via a digital telephone channel, the reception intermediate frequency signal is converted into a digital signal by an A/D converter 6 and then input to a digital demodulator circuit (DEM) 7. When the receiver circuit 3 receives the radio frequency signal transmitted via an analog telephone channel, the reception intermediate frequency signal is input to an analog audio circuit (ANALOG AUDIO) 20.

In the digital demodulator circuit 7, the reception intermediate frequency signal is subjected to the digital demodulation and converted into a digital base band signal. The digital base band signal output from the digital demodulator circuit 7 includes a digital reception signal and a digital control signal. The digital reception signal is input to an error correction coding/decoding circuit (CH-COD) 8. In the error correction coding/decoding circuit 8, the digital reception signal supplied from the digital demodulator circuit 6 is subjected to the error correction decoding process and the digital reception signal subjected to the error correction decoding process is input to a speech coding/decoding circuit (SP-COD) 9. In the speech coding/decoding circuit 9, the digital control signal DSC is supplied to the control circuit 40 via the digital demodulator circuit 7 and the error correction coding/decoding circuit 8 and is discriminated. In the speech coding/decoding circuit 9, the digital reception signal is subjected to a speech decoding process. The digital reception signal RS output from the speech coding/decoding circuit 9 is input to a digital volume (VOL) 23 via a switching circuit 10.

In the digital volume 23, a volume control signal (VOC) output from the control circuit 40 is added to the signal level of the digital reception signal RS, for example, and a digital reception signal whose signal level is varied is output. The digital reception signal is input to the echo canceler 30. The control circuit 40 generates the volume control signal according to the operation of the volume control key provided in a console unit 43 which will be described later.

On the other hand, in the analog audio circuit 20, the reception intermediate signal is FM-modulated and then subjected to the audio frequency amplification. A base band analog telephone signal output from the analog audio circuit 20 is first converted into a digital signal in the A/D converter 21 and then input to the echo canceler 30 as the digital reception signal RS via the switching circuit 10.

Figure 2:
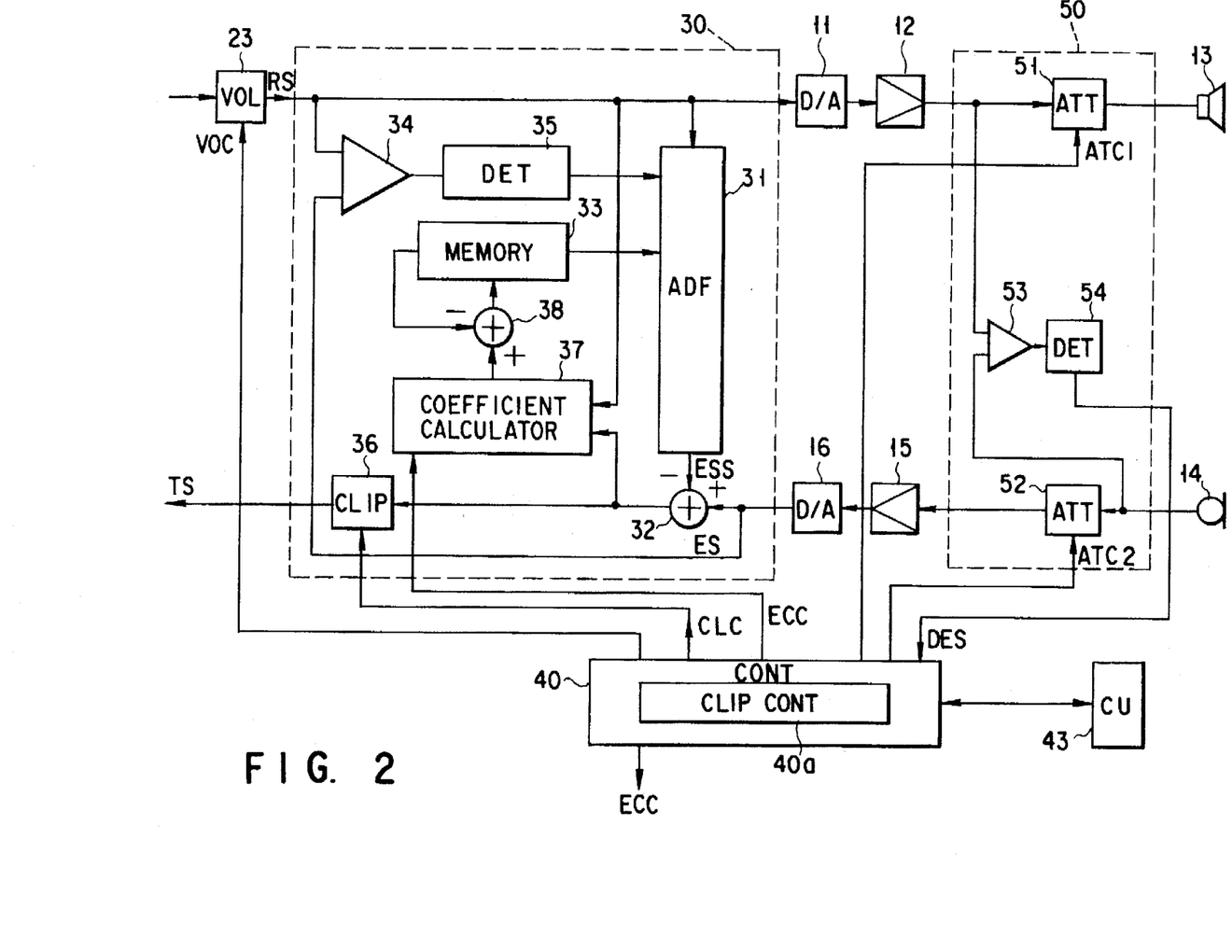
FIG. 2 is a circuit block diagram showing the constructions of an echo canceler and a speech switch together with the peripheral circuit thereof in the apparatus shown in FIG. 1.

A part of the digital reception signal RS is input to the echo canceler 30. An output from the echo canceler 30 is converted into an analog reception signal by a D/A converter 11, amplified by a reception amplifier 12, supplied to a loudspeaker 13 via a voice switching circuit 50 and then output from the loudspeaker 13. In the voice switching circuit 50, the level of the reception signal output from the reception amplifier 12 is compared with the signal level of a transmission signal input through a microphone 14 which will be described later to determine whether it is set in the reception state or the transmission state. Then, the gain in the transmission channel and the gain in the reception channel are controlled in the opposite directions according to the result of determination. The details of the voice switching circuit 50 is shown in FIG. 2.

The transmission signal of a speaker input through the microphone 14 is amplified by a transmission amplifier 15, converted into a digital transmission signal by an A/D converter 16, and then input to the echo canceler 30. In the echo canceler 30, a process for canceling the acoustic echo contained in the digital transmission signal is effected. The details of the echo canceler 30 will be described later with reference to FIG. 2.

The digital transmission signal TS output from the echo canceler 30 is input to the speech coding/decoding circuit 9 via the switching circuit 17 when the telephone channel is a digital channel. The digital transmission signal TS output from the echo canceler 30 is input to the analog audio circuit 20 via the switching circuit 17 and D/A converter 22 when the telephone channel is an analog channel.

In the speech coding/decoding circuit 9, the speech coding process for the digital transmission signal is effected. The digital transmission signal output from the speech coding/decoding circuit 9 is input to the error correction coding/decoding circuit 8 together with a digital control signal output from the control circuit 40. In the error correction coding/decoding circuit 8, the error correction coding process for the digital transmission signal and the digital control signal is effected. The digital transmission signal after the coding process is input to a digital modulator circuit (MOD) 18. In the digital modulator circuit 18, a modulated signal subjected to the π/4 shift DQPSK modulation according to the digital transmission signal is generated and the modulated signal is converted into an analog signal by the D/A converter 19 and input to a transmission circuit (TX) 5.

In the analog audio circuit 20, a modulated signal subjected to the FM modulation according to the transmission signal is generated and the modulated signal is input to the transmission circuit 5.

In the transmission circuit 5, the modulated signal is synthesized with a transmission local oscillation signal corresponding to the radio frequency of the digital telephone channel output from the frequency synthesizer 4 and converted into a radio transmission signal and then subjected to the high-frequency amplification. Then, the radio transmission signal output from the transmission circuit 5 is supplied to the antenna 1 via the antenna multiplexer 2 and transmitted from the antenna 1 towards the base station (not shown).

The positions of the switching circuits 10 and 17 are controlled by a switch control signal SWC output from the control circuit 40.

The control circuit 40 has a microcomputer as a main control section, for example, and a console unit (CU) 43 is connected to the control circuit 40. A key switch group and a display unit are provided in the console unit 43. For example, the display unit is formed of a liquid crystal display. The key switch group includes a calling key, termination key, dial keys, mode specifying key, and volume control key. The mode specifying key is used to permit the user to selectively specify the analog mode, digital mode, or dual mode. The dual mode is selected when a particular mode is not specified. The volume control key is used to permit the speaker to control the reception volume. A power source circuit 42 creates a desired operation voltage Vcc based on the output of a battery 41 and supplies the same to the above circuits.

The echo canceler 30 and the voice switching circuit 50 are constructed as follows. FIG. 2 is a circuit block diagram showing the construction thereof and the peripheral circuit thereof.

The echo canceler 30 is constructed by a DSP (Digital Signal Processor), for example, and includes an adaptive filter (ADF) 31, a subtracter 32, a coefficient calculator 37 for calculating coefficients of the adaptive filter 31, a memory 33 for storing the coefficients, a subtracter 38 for renewing the coefficients, a comparator 34 and a detector (DET) 35 which construct a double talk detection circuit, and a center clipper (CLIP) 36.

The digital reception signal RS is input to the adaptive filter 31 and the D/A converter 11. Further, the digital reception signal RS is input to the comparator 34 and the coefficient calculator 37.

An acoustic echo signal ES generated by the circulate cross talk of the reception signal from the loudspeaker to the microphone is input to the echo canceler 30 and is input to the non-inverting input terminal of the subtracter 32. The adaptive filter 31 simulates an acoustic characteristic of an echo path from the loudspeaker 13 to the microphone 14 and generates the pseudo echo signal ESS. The pseudo echo signal ESS is input to the inverting input terminal of the subtracter 32. It is possible to supply the acoustic echo signal ES to the inverting input terminal of the subtracter 32 and supply the pseudo echo signal ESS to the non-inverting input terminal of the subtracter 32.

Figure 3:
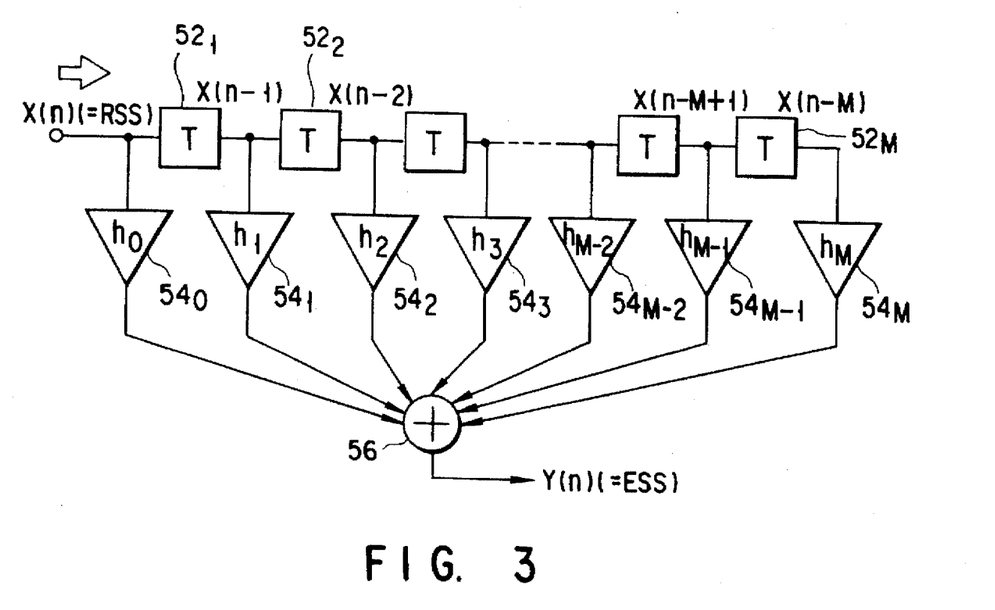
FIG. 3 is a circuit block diagram showing the detailed constructions of an adaptive filter shown in FIG. 2.

FIG. 3 shows a detailed block diagram of the adaptive filter 31. The reception signal RSS (=x(n)) is supplied to a series-connected delay circuits $52_1, 52_2, \ldots 52_M$. The delay time of one delay circuit is equal to a sampling period T. The input signal x(n) and outputs x(n−1), x(n−2), ... x(n−M) of the delay circuits $52_1, 52_2, \ldots 52_M$ are supplied to an adder 56 through amplifiers $54_0, 54_1, \ldots 54_M$. Amplification factors (coefficients) $h_0, h_1, \ldots h_M$ of the amplifiers $54_0, 54_1, \ldots 54_M$ are supplied from the coefficient memory 33. The acoustic characteristic of the echo path to be simulated can be changed by changing these coefficients $h_0, h_1, \ldots h_M$.

The reception signal RS and the output of the subtracter 32 (residual echo signal) are supplied to the coefficient calculator 37. The calculator 37 changes the coefficients of the adaptive filter 31 in an adaptive manner such that the residual signal becomes zero. For this adaptive operation, the acoustic characteristic of the space, i.e., the echo path can be estimated. The pseudo echo signal is generated based on the result of estimation and the reception signal RS. In the subtracter 32, the pseudo echo signal is subtracted from the echo signal, thereby canceling the echo signal ES.

The coefficient calculator 37 supplies the coefficients to the non-inverting input terminal of the subtracter 38. The output of the subtracter 38 is written into the memory 33. The data in the memory 33 are supplied to the inverting input terminal of the subtracter 38 and the amplifiers $54_0$, $54_1, \ldots 54_M$ in the adaptive filter 31 as amplification coefficients $h_0, \ldots h_M$.

The coefficient calculator 37 determines to which extent the magnitude (amplitude) of the reception signal RSS of each timing is reduced based on the fact which extent the reception signal RSS of each timing is remains as the echo signal and obtains the amplification coefficients $h_0, h_1, \ldots h_M$ based on the result of this determination. Therefore, the amplification coefficients $h_0, h_1, \ldots h_M$ is a value between 0 and 1. The amplification coefficients $h_0, h_1, \ldots h_M$ are stored in the memory 33 and then supplied to the adaptive filter 31. For example, if the coefficient $h_i$ for the timing "i" is 0.5 and the coefficient calculator 37 outputs the coefficient $h_{i+1}$ of 0.3 for the timing "i+1", the subtracter 38 outputs the value of −0.2 and the data of the memory 33 is subjected to a subtraction by 0.2. Therefore, the coefficient is updated to 0.3. When the echo is completely canceled, the coefficient calculator 37 continues to output the same value since it is not necessary to update the coefficient.

Since the echo is frequently generated during a hands-free conversation mode and rarely generated during a handset conversation mode, the coefficients of the adaptive filter 31 differ between the hands-free conversation mode and the handset conversation mode. Therefore, the memory 33 stores the coefficients for the hands-free conversation mode and those for the handset conversation mode, respectively. The conversation mode is set by means of the console unit 43. When the conversation mode is changed from the hands-free conversation mode to the handset conversation mode, the coefficients for the hands-free conversation mode are stored in the memory 33. When the hands-free conversation mode is set again, the coefficient data stored in the memory 33 are read out and supplied to the adaptive filter 31.

Figure 4:
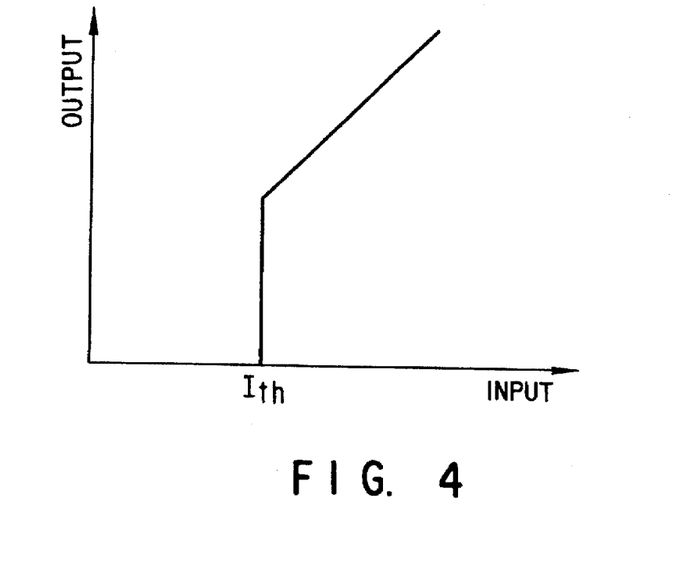
FIG. 4 shows an input/output characteristic of a center clipper shown in FIG. 2.

The output of the subtracter 32 is output through the center clipper 34. The center clipper 36 is used to eliminate the residual echo signal of a preset level or less and the operation timing thereof is controlled by a clip control signal CLC supplied from the control circuit 40. FIG. 4 shows the input/output characteristic of the center clipper 34. When the level of the input signal is lower than the preset level $I_{th}$, the output level is zero and when the level of the input signal is not lower than the preset level $I_{th}$, the input signal is output as it is.

The voice switching circuit 50 includes variable attenuators (ATT) 51 and 52 respectively inserted in the reception signal path and the transmission signal path, a comparator 53, and a detector (DET) 54. In the comparator 53, the signal level of the reception signal output from the reception amplifier 12 is compared with the signal level of the transmission signal input by the microphone 14. In the detector 54, the state of the apparatus, for example, the reception state, transmission state, speechless state (silent state) or double talk state is determined based on the comparison output of the comparator 53 and detection information DES thereof is supplied to the control circuit 40. The control circuit 40 creates a reception gain control signal ATC1 and a transmission gain control signal ATC2 based on the detection information DES, supplies the control signals ATC1 and ATC2 to the variable attenuators 51 and 52 so as to variably control the reception channel gain and the transmission channel gain in the opposite directions.

Further, the control circuit 40 includes a clip controller 40a as one of the control functions. The clip controller 40a generates a clip control signal CLC based on detection information DES of the transmission state supplied from the detector 54 of the voice switching circuit 50 and the volume control signal generated by the volume control key of the console unit 43. The clip control signal CLC is supplied to the center clipper 36 to control the operating condition of the center clipper 36.

The operation of the first embodiment with the construction described above is explained according to the control process of the control circuit 40.

Figure 5:
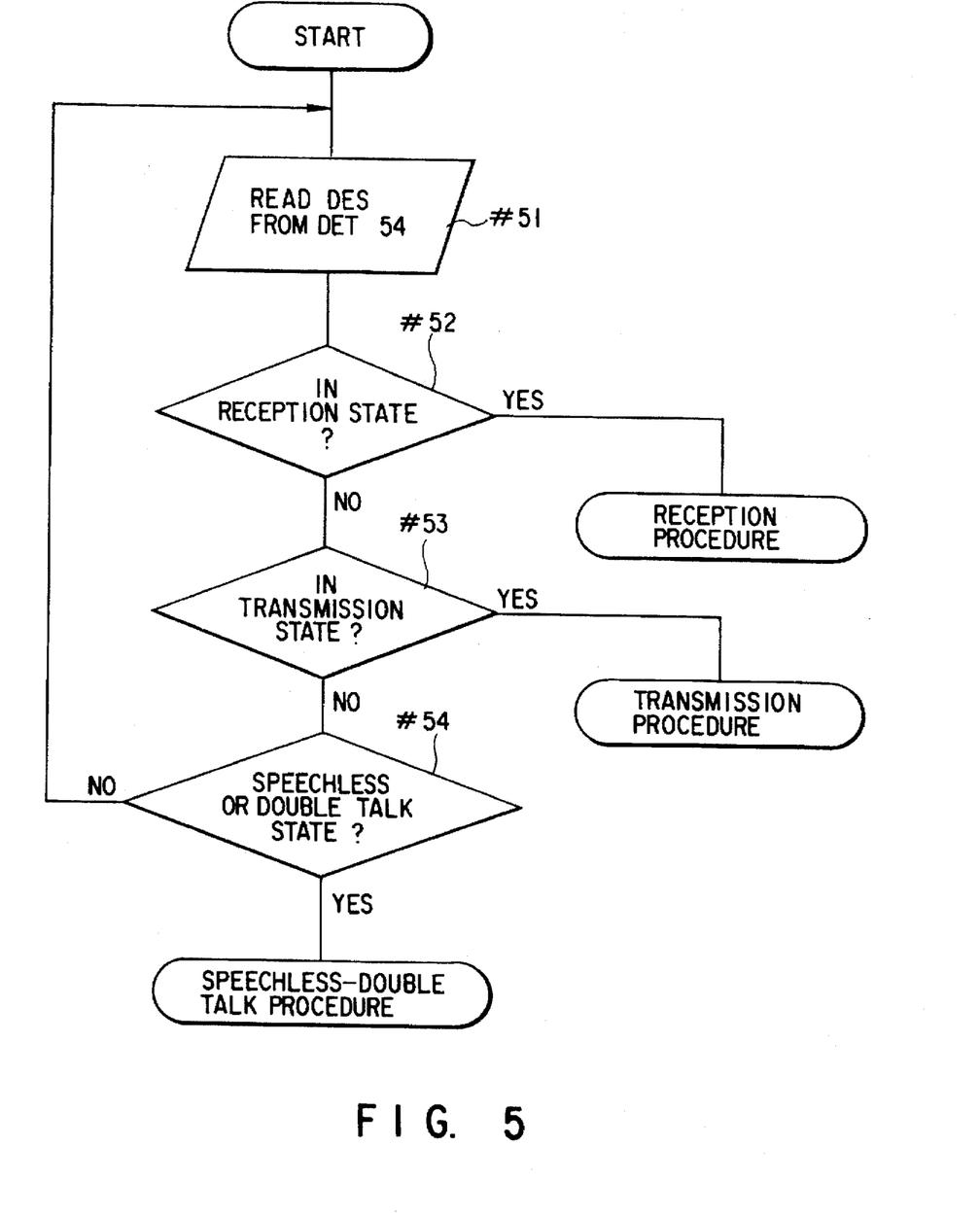
FIG. 5 is a flowchart showing a main control routine of a controller shown in FIG. 2.

Assume that a telephone link is generated with respect to a telephone apparatus of the other side of telephone via a radio circuit and wired circuit and a telephone conversation is started between the two speakers, as shown in FIG. 5. The control circuit 40 receives detection information DES of the transmission state from the detector 54 of the voice switching circuit 50 in step #51. Whether the apparatus is set in the reception state, transmission state, speechless state or double talk state is determined based on the detection information DES in the steps #52, #53, and #54.

In a state in which both of the speakers keep silent, the state is determined to be the speechless state in step #54 and the control circuit 40 starts the speechless/double talk control process.

Figure 6:
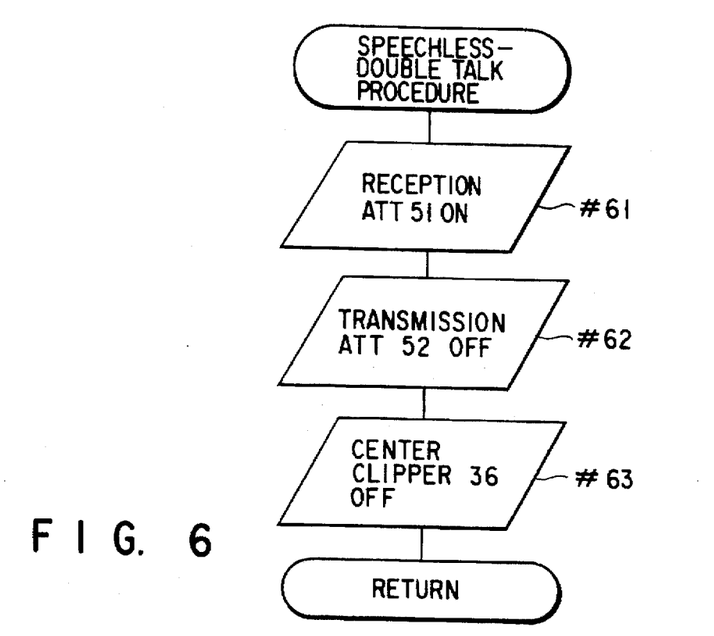
FIG. 6 is a flowchart showing a speechless/double talk control routine of the controller shown in FIG. 2.

Details of the speechless/double talk control process are shown in FIG. 6. In the speechless/double talk state, in order to preferentially effect the transmission, the control circuit 40 generates a reception gain control signal ATC1 and a transmission gain control signal ATC2 for setting the reception channel gain to a large value and setting the transmission channel gain to a small value and supplies the control signals ATC1 and ATC2 to the variable attenuators 51, 52 of the voice switching circuit 50 in steps #61 and #62. As a result, the reception channel gain is set to a large value and the transmission channel gain is set to a small value. Further, since no acoustic echo is generated in the state in which both of the speakers keep silent, the clip control signal CLC for setting the center clipper 36 in the OFF state is generated in step #63. As a result, the center clipper 36 is set into the non-operative state so as to permit the transmission signal containing the background noise to be transmitted as it is. At this time, since the speechless state is also detected by the comparator 34 and the detector 35 in the echo canceler 30, the adaptive filter 31 does not effect the adaptive process. That is, the echo canceler 30 is set into the OFF state.

Assume now that the speaker starts to speak in this state. Then, the control circuit 40 recognizes that the transmission state is set up based on the reception/transmission state detection information DES supplied from the voice switching circuit 50 in step #53 of FIG. 5 and then starts the transmission control.

Figure 7:
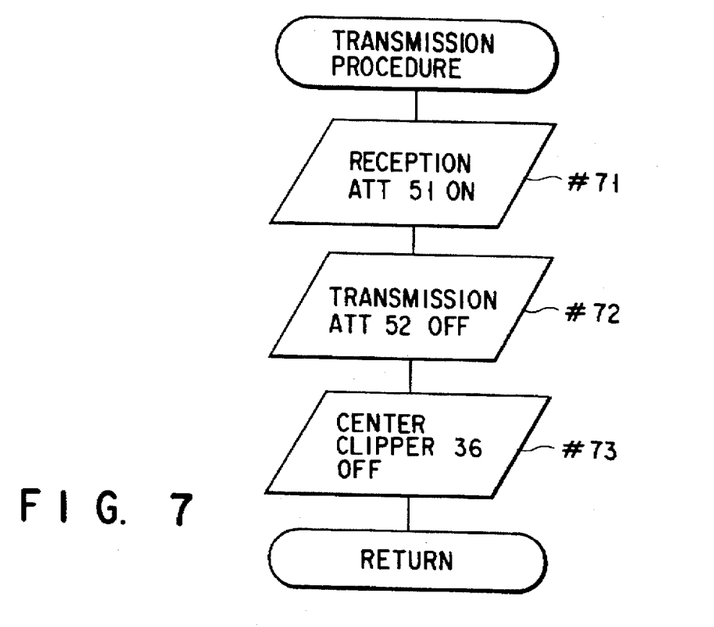
FIG. 7 is a flowchart showing a transmission control routine of the controller shown in FIG. 2.

Details of the transmission control process are shown in FIG. 7. In the transmission control state, the control circuit 40 generates a reception gain control signal ATC1 and a transmission gain control signal ATC2 for setting the reception channel gain to a large value and setting the transmission channel gain to a small value and supplies the control signals ATC1 and ATC2 to the variable attenuators 51, 52 of the voice switching circuit 50 in steps #71 and #72. As a result, the reception channel gain is set to a large value and the transmission channel gain is set to a small value in the same manner as in the speechless/double talk state. Further, since no acoustic echo is generated in the transmission state, the clip control signal CLC for setting the center clipper 36 in the OFF state is generated in step #73. As a result, the center clipper 36 is kept in the non-operative state so as to permit the transmission signal containing the background noise to be transmitted as it is. At this time, since the speechless state is also detected by the comparator 34 and the detector 35 in the echo canceler 30, the adaptive filter 31 does not effect the adaptive process and the output ESS of the adaptive filter 31 is zero. That is, the echo canceler 30 is also kept in the OFF state.

Assume now that the speaker on the destination side speaks and the reception state is detected by the comparator 53 and the detector 54 of the voice switching circuit 50. Then, the control circuit 40 recognizes the reception state in step #52 and starts the reception control process.

Figure 8:
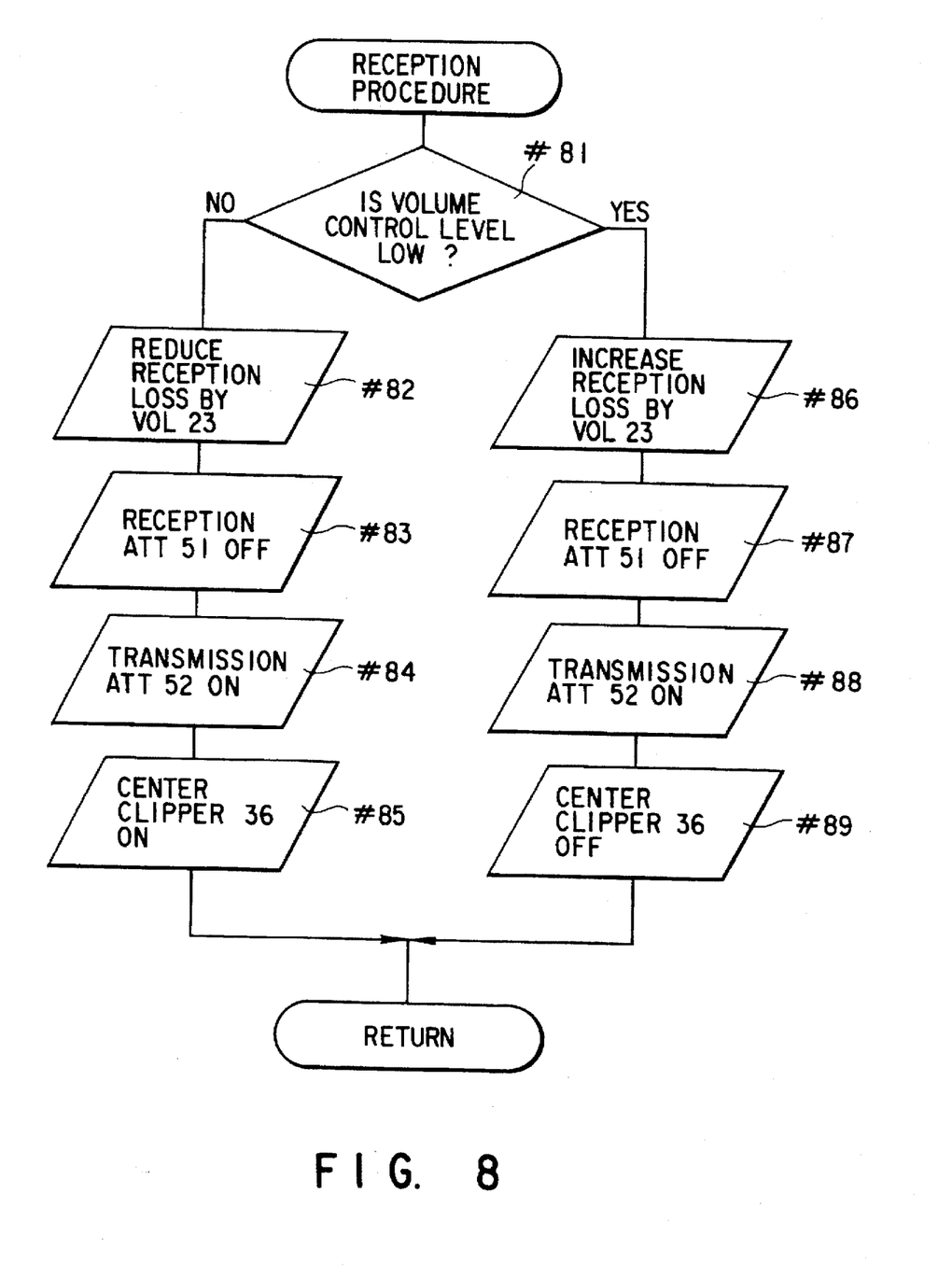
FIG. 8 is a flowchart showing a reception control routine of the controller shown in FIG. 2.

Details of the reception control process are shown in FIG. 8. In the reception control state, the control circuit 40 first fetches information of volume control level set by the volume control key of the console unit 43 and checks in step #81 whether the volume control level is equal to or higher than a preset level or not based on the information of the volume control level. If the volume control level is equal to or higher than the preset level, that is, if the volume control level is set to an intermediate level or high level, the control circuit 40 effects step #82 to output a volume control signal VOC for reducing the reception loss to the digital volume 23. Therefore, the amount of loss of the digital volume 23 is set to a small value corresponding to the volume control level set by the volume control key, and as a result, the reception signal is supplied to the loudspeaker 13 while the signal level thereof is not so much attenuated. Thus, a received voice with large volume is output from the loudspeaker 13.

Next, the control circuit 40 generates a reception gain control signal ATC1 and a transmission gain control signal ATC2 for setting the reception channel gain to a small value and setting the transmission channel gain to a large value in steps #83 and #84 and supplies the control signals ATC1 and ATC2 to the variable attenuators 51 and 52 of the voice switching circuit 50. As a result, the reception channel gain is set to a small value and the transmission channel gain is set to a large value. Further, in this case, since the volume of the reception voice is large, the possibility that the acoustic echo is generated is high. Therefore, the control circuit 40 supplies a control signal CLC for setting the center clipper 36 into the operative state to the center clipper 36 in step #85. As a result, the center clipper 36 is set into the operative state, and therefore, the residual signal of low level which has passed through the echo canceler 30 can be eliminated. At this time, since the reception state is detected by the comparator 34 and the detector 35 in the echo canceler 30, the adaptive filter 31 effects the adaptive operation. That is, the echo canceler 30 is set into the operative state to cancel the acoustic echo signal picked up by the microphone 14.

Assume that the speaker operates the volume control key to lower the volume of the reception voice. Then, the control circuit 40 checks in step #81 whether or not the volume control level is set to a level not higher than a preset level, and if it is detected that the volume control level is set to a level equal to or lower than the preset level, the control circuit 40 effects step #86 to generate a volume control signal VOC for increasing the loss of the digital volume 23. Therefore, the amount of loss of the digital volume 23 is set to a large value corresponding to the volume control level set by the volume control key, and as a result, the reception signal is supplied to the loudspeaker 13 with the signal level attenuated by a large amount. Thus, a reception voice of small volume is output from the loudspeaker 13.

Next, the control circuit 40 generates a reception gain control signal ATC1 and a transmission gain control signal ATC2 for setting the reception channel gain to a small value and setting the transmission channel gain to a large value in steps #87 and #88 and supplies the control signals ATC1 and ATC2 to the variable attenuators 51 and 52 of the voice switching circuit 50. As a result, the reception channel gain is set to a small value and the transmission channel gain is set to a large value. Further, in this case, since the volume of the reception voice is small, the possibility that the acoustic echo is generated is low, and even if it is generated, the signal level thereof is low. Therefore, the control circuit 40 supplies a control signal CLC for setting the center clipper 36 into the non-operative state to the center clipper 36 in step #89. As a result, the center clipper 36 is set into the non-operative state, and therefore, the residual signal of low level which has passed through the echo canceler 30 is transmitted as it is. Therefore, the background noise is transmitted to the speaker on the destination side, and as a result, the naturalness of the telephone is enhanced.

Further, at this time, since the reception state is detected by the comparator 34 and the detector 35 of the echo canceler 30 even if the reception signal level is low, the echo canceler 30 is kept in the operative state. Therefore, even if the acoustic echo is picked up by the microphone 14, a large acoustic echo can be canceled by the echo canceler 30.

If the double talk state is detected by the comparator 53 and the detector 54 of the voice switching circuit 50, the control circuit 40 effects the same control operation as that effected in the case of detection of the speechless state explained with reference to the procedure shown in FIG. 6. The echo canceler 30 is also set into the non-operative state as in the case of speechless state.

Figure 9:
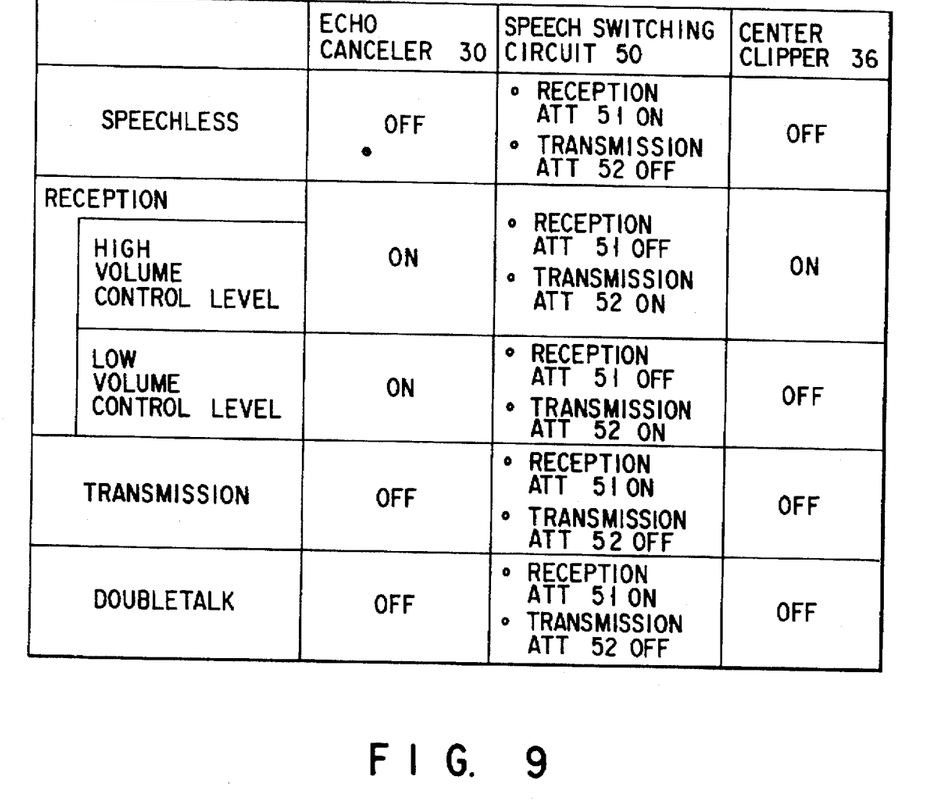
FIG. 9 is a table for illustrating the operations of the echo canceler, voice switching circuit, and center clipper in the speechless state, reception state, transmission state, and double talk state in the apparatus shown in FIG. 2.

FIG. 9 is a table for illustrating the operations of the echo canceler 30, voice switching circuit 50 and center clipper 36 in the speechless state, transmission state, reception state, and double talk state described above.

As described above, according to the first embodiment, the residual signal of a level equal to or lower than a preset level output from the subtracter 32 of the echo canceler 30 can be eliminated by the center clipper 36 in the reception state by providing the center clipper 36 on the output side of the subtracter 32 in the echo canceler 30 and controlling the operation state of the center clipper 36 according to the reception/transmission state. Therefore, it becomes unnecessary to effect the arithmetic operation for canceling the acoustic echo signal of the preset level or less in the echo canceler 30, and as a result, the load of the echo canceler can be alleviated. Therefore, it becomes possible to lower the operation speed of the echo canceler 30 so that the signal processing circuit including the echo canceler 30 can be made simple in construction and low in cost.

Further, in this embodiment, the operation of the center clipper 36 is controlled by the control circuit 40 based on the reception/transmission state detection information DES detected by the comparator 53 and the detector 54 provided in the voice switching circuit 50. That is, the reception/transmission state detection circuit provided in the voice switching circuit 50 is also used as a reception/transmission state detection circuit for controlling the center clipper. Therefore, it is not necessary to newly provide a reception/transmission state detection circuit for controlling the operation of the center clipper 36, thereby making it possible to make the circuit construction simple.

Further, in this embodiment, the operation of the center clipper 36 is controlled by taking not only the result of detection of the reception/transmission state but also the volume control level by the digital volume 23 into consideration, and in a case where the digital volume 23 is set to lower the volume of the reception voice even in the reception state, it is determined that the possibility of generation of the acoustic echo is low and the center clipper 36 is set in the non-operative state. Therefore, a speech can be transmitted without eliminating the background noise, thereby making it possible to enhance the naturalness of the telephone conversation.

Figure 10:
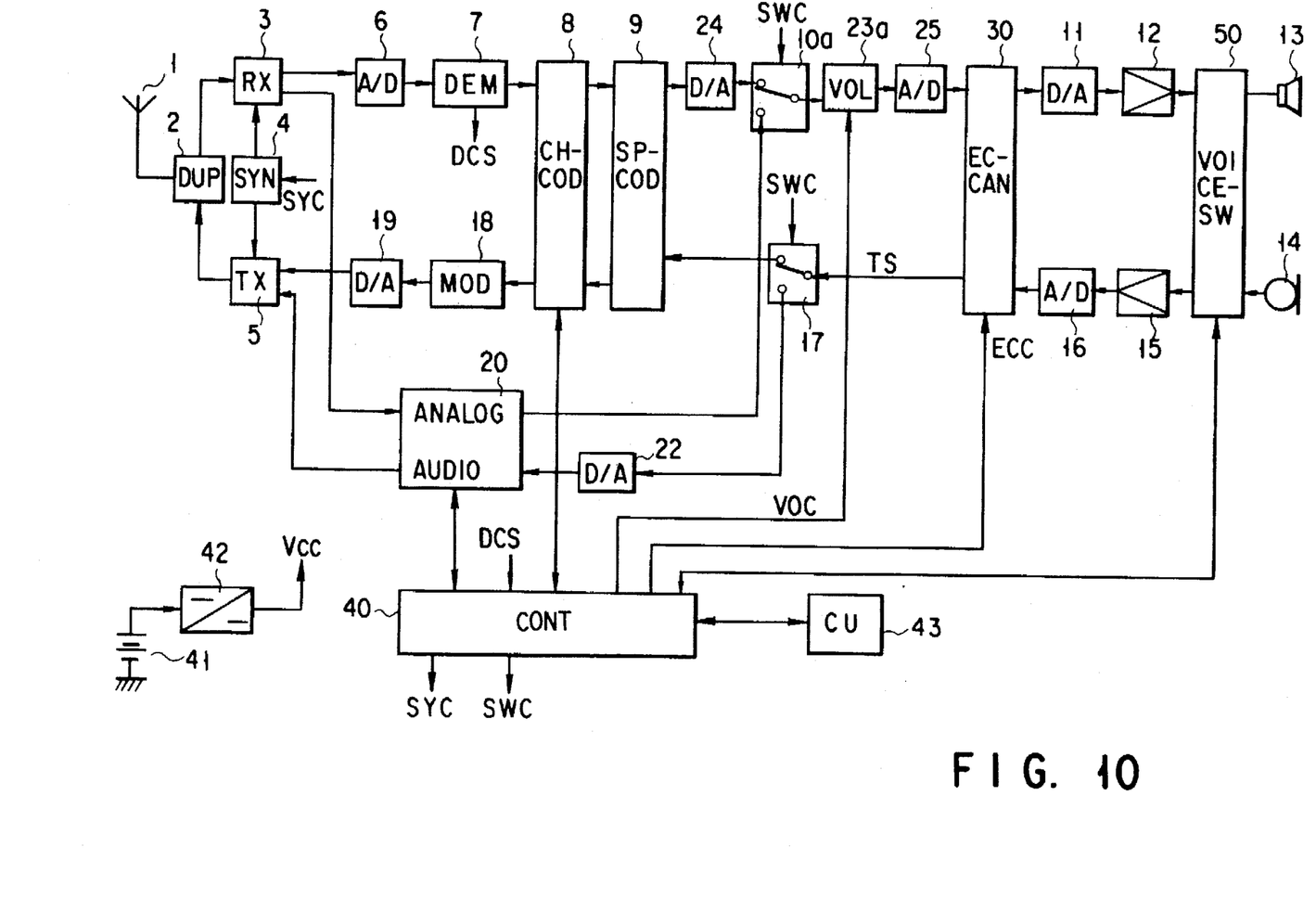
FIG. 10 is a circuit block diagram showing the construction of a dual mode radio telephone apparatus according to a second embodiment of the present invention.
Figure 11:
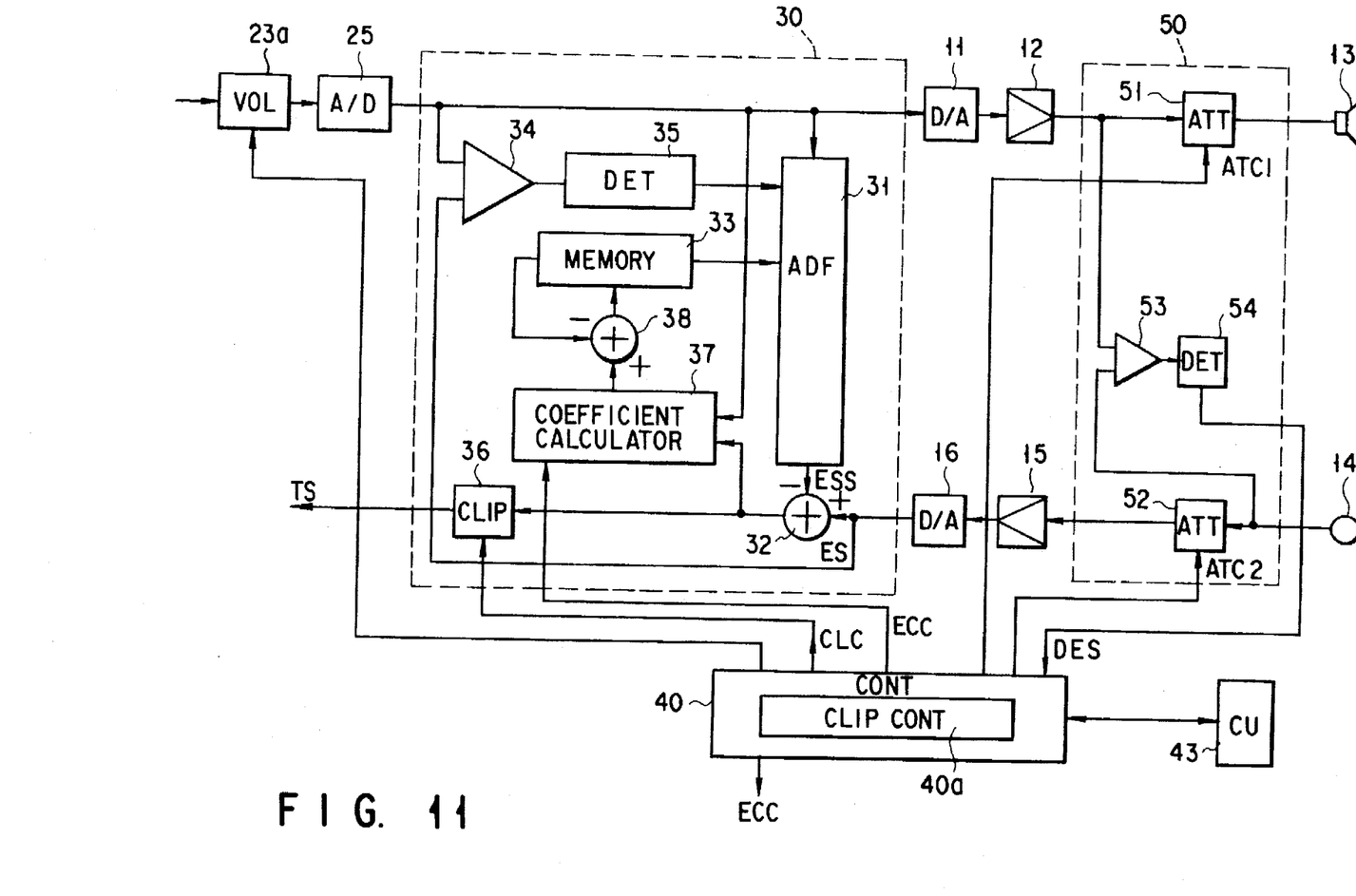
FIG. 11 is a circuit block diagram showing the constructions of an echo canceler and a speech switch together with the peripheral circuit thereof in the apparatus shown in FIG. 10.

Other embodiments of the present invention will be described. In the first embodiment, the digital volume for controlling the level of a digital reception signal by the digital process is used as the volume for controlling the volume of reception voice. However, it is possible to use an analog volume as the volume for controlling the volume of reception voice. FIG. 10 is a circuit block diagram showing the construction of a dual mode radio telephone apparatus having the analog volume, and FIG. 11 is a circuit block diagram showing the construction of the main portion of the apparatus having the above analog volume. In FIGS. 10 and 11, portions which are the same as those of FIGS. 1 and 2 are denoted by the same reference numerals and the detail explanation therefore is omitted.

In FIGS. 10 and 11, a digital reception signal RS output from a speech coding/decoding circuit 9 is converted into an analog reception signal by a D/A converter 24 and then input to an analog volume 23a via a switching circuit 10a which is constructed by an analog switch. For example, the analog volume 23a is constructed by a variable resistor and functions to change the signal level of the analog reception signal according to a gain control signal VOC output from a control circuit 40 and output the same. An analog reception signal output from the analog volume 23a is converted into a digital reception signal by an A/D converter 25 and then input to an echo canceler 30.

Further, an analog reception signal output from an analog speech circuit 20 is input as it is to the analog volume 23a via the switching circuit 10a. Then, the analog signal whose signal level is changed by the analog volume 23a is converted into a digital signal by the A/D converter 25 and input to the echo canceler 30.

As described above, according to the second embodiment, the signal delay can be reduced in comparison with the first embodiment wherein the digital volume is used by using the analog volume.

Additional advantages and modifications will readily occur to those skilled in the art. Therefore, the present invention in its broader aspects is not limited to the specific details, representative apparatuses, and illustrated examples shown and described herein. Accordingly, various modifications may be made without departing from the spirit or scope of the general inventive concept as defined by the appended claims and their equivalents. For example, in the above embodiments, the center clipper 36 is provided in the echo canceler 30 and the signal processing for clipping is effected by use of a DSP constructing the echo canceler 30, but it is possible to independently provide the center clipper 36 in the succeeding stage of the echo canceler 30. It is also possible to provide the digital volume 23 of the first embodiment within the echo canceler 30. The volume for controlling the level of the reception signal can be connected between the echo canceler 30 and loudspeaker 13.

Further, each step of the flowcharts shown in FIGS. 5 to 8 may be executed in a different order. For example, three determination steps #52, #53, and #54 shown in FIG. 5; three ON/OFF steps #61, #62, and #63 shown in FIG. 6; three ON/OFF steps #71, #72, and #73 shown in FIG. 7; three ON/OFF steps #82, #83, and #84 shown in FIG. 8; and three ON/OFF steps #86, #87, and #88 shown in FIG. 8 can be executed in the different order.

The operations of the voice switching circuit 5 and the center clipper 36 are controlled b the control circuit 40 which controls the operation of the whole apparatus, but it is possible to provide a speech switch control circuit and a center clipper control circuit in addition to the control circuit 40 and use the control circuits to control the operations of the above circuits.

In addition, the constructions of the center clipper, echo canceler, and voice switching circuit, the type of control of the center clipper, and the construction of the speech communication apparatus can be variously modified without departing from the technical scope of the present invention.

In the above embodiments, the mobile telephone is described as the speech communication apparatus. However, the present invention is not limited to the radio speech communication apparatus, but can be applied to a wired telephone apparatus, radio communication apparatus, or transceiver. Further, the acoustic echo may be generated during the handset conversation mode. Therefore, the present invention can be applied to a telephone without a hands-free conversation mode.

As described above, in the present invention, the signal clip means for eliminating the residual signal of a preset level or less which has passed through the echo canceler is provided on the transmission signal output side of the echo canceler and the clip control means is provided. The clip control means compares the signal level of a reception signal input to the loudspeaker means for hands-free telephone conversation with the signal level of a transmission signal input by the microphone means to determine whether the apparatus is set in the reception state or not, and he residual signal eliminating operation of the signal clipping means is controlled based on the result of determination.

Therefore, according to the present invention, the acoustic echo component can be fully canceled without causing the echo canceler to effect a large amount of arithmetic operations at a high speed, thereby making it possible to provide a speech communication apparatus which is inexpensive, low in power consumption and can permit high-quality telephone conversation.

Further, in the present invention, in a case where the speech communication apparatus comprises the determining means for comparing the signal level of a reception signal input to the loudspeaker means with the signal level of a transmission signal input by the microphone means to determine whether the reception state is set or not, and the speech switching means for controlling the gains of the reception signal path and transmission signal path in the opposite directions according to the result of determination by the determining means, the clip control means is commonly used as the determining means of the switching means.

Therefore, a speech communication apparatus which can be realized by a simple circuit construction without a large-scale circuit modification and circuit addition can be provided.

Further, in the present invention, a case where the reception volume controlling means changing the reception signal level input to the loudspeaker means is provided in the reception signal path, the residual signal eliminating operation of the signal clip means is controlled by the clip control means based on the result of determination of the transmission/reception state and the variable amount of the reception signal level by the reception volume controlling means.

Therefore, a speech communication apparatus in which when the reception volume is small even in the reception state, the clip operation is interrupted to permit the background noise to be transmitted, thereby enhancing the naturalness of the telephone communication can be attained.

What is claimed is:

1. (Twice Amended) A speech communication apparatus comprising:

communication means for transmitting a speech signal and for receiving a speech signal;

loudspeaker means for outputting a speech signal received by said communication means;

microphone means for inputting a speech signal to said communication means;

echo cancel means, connected between said loudspeaker means and said communication means, and connected between said microphone means and said communication means, for canceling an echo signal which is generated due to a fact that a speech signal output from said loudspeaker means is input to said microphone means;

clip means, connected to said echo cancel means for receiving a transmission signal output from said echo cancel means, for clipping a transmission signal whose level is lower than a preset level;

means for comparing a level of the reception signal supplied to said loudspeaker means and a level of a transmission signal input by said microphone means to determine whether the apparatus is set in a reception state or a transmission state;

volume control means, connected between said loudspeaker means and said communication means, for controlling a level of a reception signal input to said loudspeaker means; and first control means for controlling an operation of said clip means based on a result of a determination by said comparing means and a level of a reception signal controlled by said volume control means;

wherein the clip means is further on/off controlled in accordance with the volume level.

2. A speech communication apparatus comprising:

communication means for transmitting a speech signal and for receiving a speech signal;

loudspeaker means for outputting a speech signal received by said communication means;

microphone means for inputting a speech signal to said communication means;

echo cancel means, connected between said loudspeaker means and said communication means, and connected between said microphone means and said communication means, for canceling an echo signal which is generated due to a fact that a speech signal output from said loudspeaker means is input to said microphone means;

clip means, connected to said echo cancel means for receiving a transmission signal output from said echo cancel means, for clipping a transmission signal whose level is lower than a preset level;

means for comparing a level of a reception signal supplied to said loudspeaker means and a level of a transmission signal input by said microphone means to determine whether the apparatus is set in a reception state or a transmission state;

volume control means, connected between said loudspeaker means and said communication means, for controlling a level of a reception signal input to said loudspeaker means; and first control means for controlling an operation of said clip means based on a result of determination by said comparing means and a level of a reception signal controlled by said volume control means, wherein said clip means is set in a non-operative state when the level of the reception signal controlled by said volume control means is lower than a predetermined level.

3. An apparatus according to claim 2, wherein said echo cancel means and said clip means are formed of a digital signal processor.

4. An apparatus according to claim 2, wherein said apparatus is a mobile telephone with hands-free conversation mode.

5. An apparatus according to claim 2, wherein said loudspeaker means and said microphone means are formed of a loudspeaker for hands-free conversation and a microphone for hands-free conversation.

6. An apparatus according to claim 2, wherein said apparatus is a dual mode mobile telephone with hands-free conversation mode.

7. An apparatus according to claim 2, wherein said echo cancel means comprises:

arithmetic operation means for generating a pseudo echo signal based on an input signal to said echo cancel means and coefficients for simulating an acoustic characteristic of an echo path from said loudspeaker means to said microphone means;

subtraction means for obtaining a difference between a transmission signal input by said microphone means and the pseudo echo signal; and means for changing the coefficients of said arithmetic operation means such that the difference obtained by said subtraction means is zero.

8. An apparatus according to claim 7, wherein said arithmetic operation means comprises:

series-connected delay circuits for delaying the input signal to said echo cancel means;

amplifiers for respectively amplifying outputs of said series-connected delay circuits in accordance with the coefficients; and means for adding outputs of said amplifiers.

9. An apparatus according to claim 2, wherein said comparing means determines whether the apparatus is set in a speechless/double talk state, reception state, or a transmission state; and said first control means enables the operation of said clip means during the reception state and disables the operation of said clip means during the speechless/double talk state and the transmission state.

10. An apparatus according to claim 9, further comprising second control means for controlling an operation of said echo cancel means based on a result of a determination by said comparing means.

11. An apparatus according to claim 10, wherein said second control means enables the operation of said echo cancel means during the reception state and disables the operation of said echo cancel means during the speechless/double talk state and the transmission state.

12. An apparatus according to claim 2, wherein said comparing means determines whether the apparatus is set in a speechless/double talk state, reception state, or a transmission state; and said first control means enables the operation of said clip means only when the apparatus is set in the reception state and the level of a reception signal controlled by said volume control means is higher than a preset level.

13. An apparatus according to claim 12, further comprising second control means for controlling an operation of said echo cancel means based on a result of a determination by said comparing means.

14. An apparatus according to claim 13, wherein
said second control means enables the operation of said echo cancel means during the reception state and disables the operation of said echo cancel means during the speechless/double talk state and the transmission state.

15. An apparatus according to claim 2, wherein said comparing means further determines that said apparatus is set in a speechless state or a doubletalk state and said first control means sets said clip means in a non-operative state when said comparing means determines that said apparatus is set in the speechless state or the doubletalk state, and said apparatus further comprises voice switching means for controlling a transmission gain and a reception gain in opposite directions based on a result of determination by said comparing means, the transmission gain being decreased and the reception gain being increased when said comparing means determines that said apparatus is set in the speechless state or the doubletalk state.

16. An apparatus according to claim 15, in which said voice switching means increases the reception gain and decreases the transmission gain during the speechless/double talk state and the transmission state; and increases the transmission gain and decreases the reception gain during the reception state.

17. An apparatus according to claim 16, wherein
said comparing means determines whether the apparatus is set in a speechless/double talk state, reception state, or a transmission state; and
said first control means enables the operation of said clip means only when the apparatus is set in the reception state and the level of a reception signal controlled by said volume control means is higher than a preset level.

18. An apparatus according to claim 17, further comprising second control means for controlling an operation of said echo cancel means based on a result of determination by said comparing means.

19. An apparatus according to claim 18, wherein
said second control means enables the operation of said echo cancel means during the reception state and disables the operation of said echo cancel means during the speechless/double talk state and the transmission state.

20. A speech communication apparatus comprising:
a microphone;
a transmitter for transmitting a speech signal input to said microphone;
a receiver;
a speaker for outputting a speech signal received by said receiver;
a clipping circuit for clipping the speech signal input to said microphone if the level of the speech signal input to said microphone is lower than a preset level;
a volume level setting circuit for setting a volume level of the speech signal received by said receiver; and
a clipping control circuit for controlling said clipping circuit based on the volume level set by said volume level setting circuit;

wherein said clipping control circuit sets said clipping circuit in a non-operative state when the volume level set by said volume level setting circuit is lower than a predetermined level.

21. An apparatus according to claim 20, wherein said volume level setting circuit is a digital volume setting circuit.

22. An apparatus according to claim 20, wherein said volume level setting circuit is an analog volume setting circuit.

23. An apparatus according to claim 20, further comprising:
a console unit including a volume control key for controlling said volume level setting circuit to set the level of the received speech signal supplied to said speaker.

24. An apparatus according to claim 20, wherein said speech communication apparatus is a mobile telephone having a hands-free conversation mode.

25. An apparatus according to claim 20, wherein said speaker is a speaker for hands-free free conversation and said microphone is a microphone for hands-free conversation.

26. An apparatus according to claim 20, wherein said speech communication apparatus is a dual analog/digital mode radio telephone having a hands-free conversation mode.

27. An apparatus according to claim 20, wherein said clipping circuit is arranged in a transmit channel including said microphone and said transmitter and said volume level setting circuit is arranged in a receiver channel including said receiver and said speaker.

28. An apparatus according to claim 20, further comprising:
an echo canceling circuit for canceling acoustic feedback between said speaker and said microphone.

29. An apparatus according to claim 28, wherein said clipping circuit is part of said echo canceling circuit.

30. An apparatus according to claim 20, further comprising:
an echo canceling circuit for canceling acoustic feedback between said speaker and said microphone;
a detecting circuit for detecting an operation state of said speech communication apparatus;
an echo canceling control circuit for controlling said echo canceling circuit based on the state detected by said detecting circuit, and
wherein said clipping control circuit further controls said clipping circuit based on the state detected by said detecting circuit.

31. An apparatus according to claim 30, wherein said detecting circuit detects a receiving state of said speech communication apparatus.

32. An apparatus according to claim 31, wherein
said echo canceling control circuit enables operation of said echo canceling circuit when said speech communication apparatus is in the receiving state, and
said clipping control circuit enables operation of said clipping circuit when said speech communication apparatus is in the receiving state and the volume level set by said volume level setting circuit is higher than a preset volume level.

33. An apparatus according to claim 20, further comprising:
a detecting circuit for detecting an operation state of said speech communication apparatus, and
wherein said clipping control circuit further controls said clipping circuit based on the state detected by said detecting circuit.

34. An apparatus according to claim 33, wherein said detecting circuit detects whether said speech communication apparatus is in a transmitting state or a receiving state.

35. An apparatus according to claim 34, wherein said clipping control circuit enables operation of said clipping circuit when said speech communication apparatus is in the receiving state and disables operation of said clipping circuit when said speech communication apparatus is in the transmitting state.

36. An apparatus according to claim 34, wherein said clipping control circuit enables operation of said clipping circuit when said speech communication apparatus is in the receiving state and the volume level set by said volume level setting circuit is higher than a preset volume level.

37. An apparatus according to claim 33, wherein said detecting circuit detects whether said speech communication apparatus is in a transmitting state, a receiving state, or a speechless/double talk state.

38. An apparatus according to claim 37, wherein said clipping control circuit enables operation of said clipping circuit when said speech communication apparatus is in the receiving state and disables operation of said clipping circuit when said speech communication apparatus is in the transmitting or the speechless/double talk state.

39. An apparatus according to claim 33, wherein said detecting circuit includes a comparing circuit for comparing a level of the speech signal received by said receiver and a level of the speech signal input to said microphone to detect the state of said speech communication apparatus.

* * * * *